United States Patent [19]

Nakanishi et al.

[11] 4,175,693
[45] Nov. 27, 1979

[54] METHOD FOR ENHANCING THE RELIABILITY OF OUTPUT DATA FROM A LABEL READER

[75] Inventors: Sadao Nakanishi; Kazuhiro Suzuki; Nobufumi Tokura; Shinichiro Endo, all of Ise, Japan

[73] Assignee: Shinko Electric Co., Ltd., Tokyo, Japan

[21] Appl. No.: 891,219

[22] Filed: Mar. 29, 1978

[30] Foreign Application Priority Data

Apr. 7, 1977 [JP] Japan .................................. 52/40141

[51] Int. Cl.² ........................ G06K 7/14; G06K 9/13
[52] U.S. Cl. ................................ 235/463; 340/146.3 Z
[58] Field of Search ............... 235/463, 464, 465, 466; 250/566; 340/146.3 F, 146.3 Z, 149 A, 149 R

[56] References Cited

U.S. PATENT DOCUMENTS

| | | | |
|---|---|---|---|
| 3,588,457 | 6/1971 | Bijleveld | 340/146.3 Z |
| 3,744,026 | 7/1973 | Wolff | 340/146.3 Z |
| 3,806,706 | 4/1974 | Hasslinger | 340/146.3 Z |
| 3,818,191 | 6/1974 | Fennema | 235/465 |
| 3,818,444 | 6/1974 | Connell | 340/146.3 Z |
| 3,882,464 | 5/1975 | Zamkow | 235/463 |
| 4,044,227 | 8/1977 | Holm | 235/466 |

OTHER PUBLICATIONS

Allen, L. G., -Data Comparison Device, IBM Tech. Disc. Bull., vol. 2, No. 4, pp. 123-124, Dec. 1959.

Primary Examiner—Robert M. Kilgore
Attorney, Agent, or Firm—Lane, Aitken & Ziems

[57] ABSTRACT

A method for enhancing the reliability of output data from a label reader adapted to read a bar code consisting of a plurality of bars. Each bar in the bar code is scanned at a plurality of points and sets of binary symbols representative of the scanned points along each bar are obtained. Two sums are then formed for each bar, the first being the number of binary "1"s in the set and the second being the number of binary "0"s in the set, and the ratio of two sums is computed. If the ratio is larger than $(1+\alpha)$ for $\alpha>0$, then the data corresponding to the numerator sum is regarded as reliable. If the ratio is less than $(1-\beta)$ for $0<\beta<1$, then the data corresponding to the denominator sum is regarded as reliable. If the ratio is equal to or larger than $(1-\beta)$ but equal to or less than $(1+\alpha)$, then the data is regarded as unreliable.

4 Claims, 3 Drawing Figures

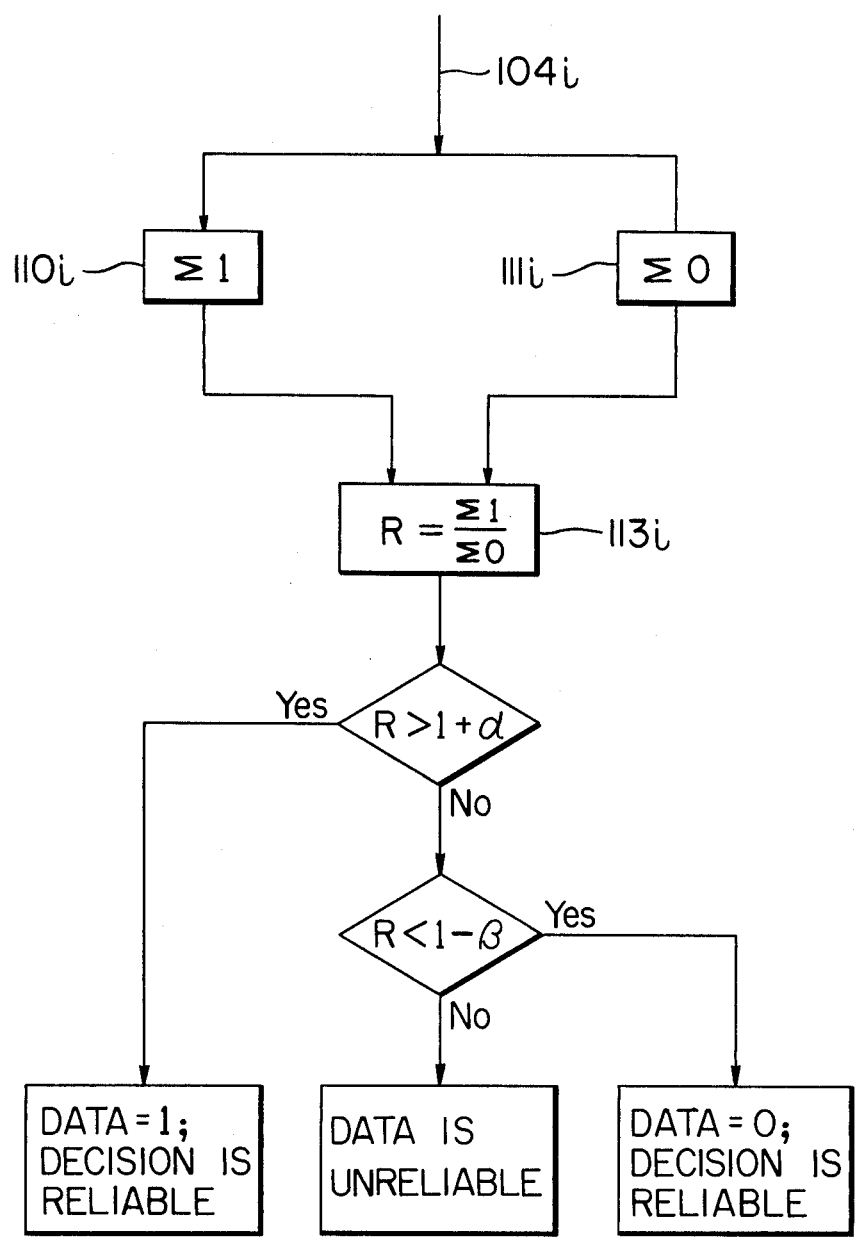

METHOD FOR ENHANCING THE RELIABILITY OF OUTPUT DATA FROM A LABEL READER

BACKGROUND OF THE INVENTION

The present invention relates to a method for enhancing the reliability of the output data from a label reader. Recently, computer based systems for inventory control have seen widespread use in supermarkets, department stores and the like. The successful operation of these computerized inventory systems is dependent, typically, upon the ability of certain peripheral equipment known as label readers to reliably read data encoded in the labels associated with the inventory items and to provide the correct data to the computer.

Typical label codes include so-called bar codes consisting of a plurality of bars with different widths or colors. The arrangement of the bars in such a code can be interpreted to identify the particular goods and the like. Such bar codes are usually printed on a price tag or other label associated with the goods.

However, printed bar codes frequently suffer from defects such as blurring, incomplete or defective bar shapes, bar inclination, fading, and similar problems. Such defective bar codes may result in erroneous readings by the label reader. Reading errors, of course, can also occur due to malfunctions in the label reader itself. If erroneous data is provided to the computer by the label reading peripheral equipment, the computer system will then compound the error, and the inventory control system will be ineffective.

SUMMARY OF THE INVENTION

Accordingly, an object of the present invention is to provide a method for enhancing the reliability of the output data from label reader in order to eliminate erroneous readings such as may occur if a bar code is defective in shape, arrangement, color, etc. The method of the present invention can also detect when the data actually read by the label reader is unreliable.

The method includes, in a label reader adapted to read bar codes, scanning each bar in a bar code consisting of a plurality of bars at a plurality of points along each bar and obtaining binary data representative of each of the different points along each bar. The number of binary "1"s and "0"s corresponding to each bar are then separately summed, and the ratio of the two sums is computed for each bar. Then, if the ratio is larger than $(1+\alpha)$ for $(\alpha>0)$, the data corresponding to the numerator sum is regarded as reliable. On the other hand, if the ratio is less than $(1-\beta)$ for $(0<\beta<1)$, the data corresponding to the denominator is regarded as reliable. However, if the ratio is equal to or larger than $(1-\beta)$ but equal to or less than $(1+\alpha)$, then the data is regarded as unreliable.

The scanning thus described preferably covers the major portion or all of each bar in the bar code so that neither a concentration nor a scatter of defects along a given bar can prevent reliable data output from the label reader. Moreover, a constant assessment is provided of the probable reliability of the output data to further minimize the likelihood of undetected errors.

Other objects and advantages of the present invention will be apparent from the following description taken in connection with the accompanying drawings.

BRIEF DESCRIPTION OF THE DRAWINGS

FIG. 3 is a partial block, partial flow diagram useful in describing the method of the present invention.

DESCRIPTION OF THE PREFERRED EMBODIMENT

Figure 1:
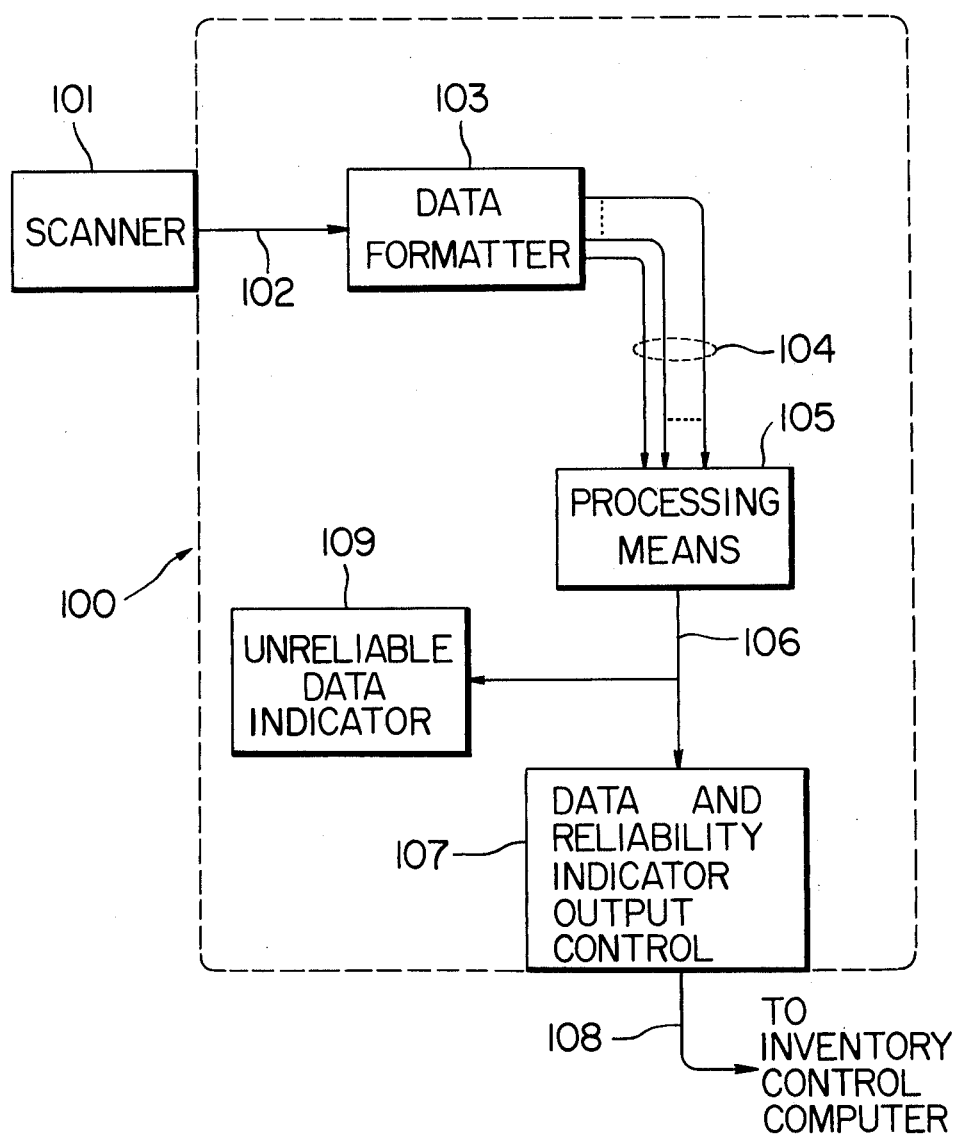
FIG. 1 is a block diagram of a label reader of a type suitable for use with the method of the present invention.

As shown in FIG. 1, a label reader 100 including a scanner 101 is adapted to scan labels, such as bar code labels, and to provide data output signals on a signal line 108 to an inventory control computer (not shown). The scanner 101 can be of any one of several well known types and, for example, may include a plurality of separate optical scanning means (not shown) to simultaneously scan along a plurality of scanning lines. Alternatively, the scanner 101 may contain a fewer number of optical scanning means, but instead employ electromechanical means (not shown) to achieve a desired scanning pattern.

In operation, an item having a label bar code thereon is suitably positioned or caused to move past or relative to the scanning element (not shown) of the scanner 101. This can be accomplished by a manual operator or by automatic handling equipment, depending upon the particular environment in which the labels are to be read. The scanner 101 then scans the label and provides raw output data on a signal line 102 representative of the scanned bar code. The raw data from the scanner is typically a sequence of binary symbols and is provided as an input signal to a data formatter 103. The data formatter or demultiplexer 103 typically separates the raw data into separate bit streams or sets of binary symbols, each being related to a particular bar of the bar code, all as will be more fully described. The data formatter 103 provides output signals on signal lines 104, the signals on each such signal line corresponding to a particular bar of the bar code.

The signal lines 104 are operably connected to the input of a processing means 105 which further processes the raw data from the scanner 101 to enhance the reliability of the output decisions from the label reader 100, as will be more fully described. The output from the processing means 105 is provided on a signal line 106 to an output control means 107 and also to a "unreliable data indicator" 109 which preferably is co-located with the label reader. In the event the label reader determines that the scanned data cannot be read reliably, the "unreliable data indicator" 109 will provide an indication, for example, to a manual operator so that the label code associated with the particular item just scanned may thereupon be manually read or determined by other means. The output control 107 controls the output data and reliability indicator signals to the inventory control computer (not shown) over the signal line 108 as previously described.

Figure 2:
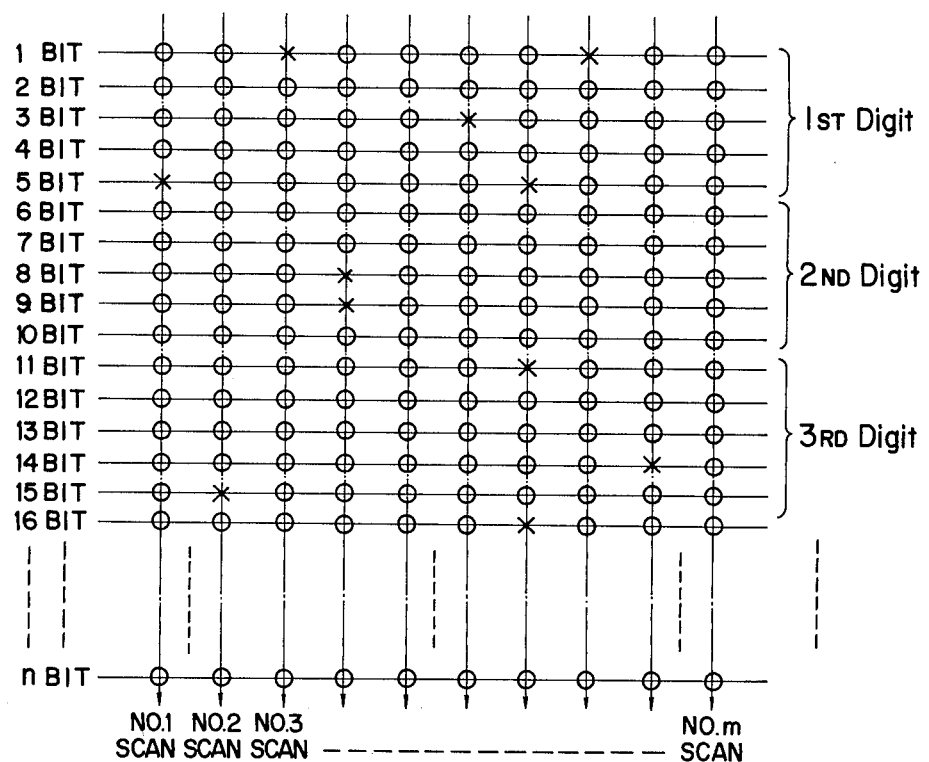
FIG. 2 is an illustration of a bar code, further indicating scanning lines thereon, and useful in describing the method of the invention.

In FIG. 2, the horizontal lines labelled 1, 2, . . . n represent the center lines for bars of a bar code label such as would be affixed to a package or the like. For purposes of explanation, it can be considered that the bars, the center lines of which are thus defined, can have different widths, and that the bar width pattern defines the particular bar code to be recognized by the inventory control computer (not shown). For example, it may be assumed for purposes of illustration that a bit "1" would be assigned to a wide bar, and a bit "0" to a narrow bar in such a bar code.

In a bar code of this type, the sequence of bars or of possible bar positions is usually further segmented into groups having specific meanings. For example, in the illustration in FIG. 2, the combination of bars 1, 2, . . . 5 indicates a first digit of a specific number. Similarly, bars 6, 7, . . . 10 indicate the second digit of a specific number, and so forth. With such a bar code arrangement, each bar can be regarded as representing a binary bit, and one digit of a specific number is constructed by five bits or five bars.

In order for a bar code of this type to be read by the label reader 100, the bar code is first brought into an appropriate position relative to the scanner 101. The scanner 101 then performs a scanning sequence along a plurality of scanning lines No. 1, No. 2, . . . No. m as shown in FIG. 2 in a direction transverse to the center lines of the respective bars comprising the bar code. This type of scan can be accomplished, for example, either by a sequential scanning movement by a single optical scanner element (not shown), by a simultaneous relative movement of a plurality of optical scanning elements (not shown) appropriately arranged or by other equivalent means.

Important to an understanding of the method of the present invention, is the fact that the scanner 101 will potentially provide a raw data output signal for each point at which a scanning line crosses a bar of the bar code in FIG. 2. For example when a particular bar intersected by a scanning line is wide, a binary "1" raw data output signal is produced by the scanner. On the other hand, if the bar is narrow, a binary "0" raw data output signal is provided by the scanner. Alternatively, the raw data output signal provided by the scanner 101 may be reversed for wide and narrow bars. Thus, a binary "0" raw data output signal will be produced when a particular bar is wide and a binary "1" raw data output signal produced if the bar is narrow. In FIG. 2, the symbol * at selected intersections between bar center lines and scanning lines designates, for purposes of illustration, unintelligible scanning points for which the scanner 101 cannot be relied upon to produce correct output signals. The other symbols at the cross-points in FIG. 2 being the symbols $\oplus$ indicate scanning points in which the raw data output from the scanner 101 would most likely be either a correct "1" or a correct "0". As previously described, the raw data output from the scanner is provided to a data demultiplexer 103 which demultiplexes the raw bit stream data and associates it with the particular bars comprising the bar code. The demultiplexed data provided on signal lines 104 are provided to the processing means 105 as previously described.

FIG. 3 illustrates, in part, a processing algorithm implementing the method of the present invention to enhance the reliability of the output data from the label reader and to provide a reliability indicator for such output data. An input signal line $104i$ associated with the ith bar of the bar code is connected to two summation means, $110i$ and $111i$. The summation means $110i$ counts the total number of binary "1" raw data signals associated with the ith bar. Similarly, the summation means $111i$ counts the total number of binary "0" raw data signals associated with the ith bar. After these two summations have been completed for a given bar and all the raw data associated with the ith bar line as scanned have been summed, the contents, $\Sigma 1$ and $\Sigma 0$, of the summation or counter means $110i$ and $111i$ are provided as input signals to a ratio forming or computing means $113i$. The ratio computing means $113i$ computes a ratio R equal to $\Sigma 1/\Sigma 0$. The ratio of $\Sigma 1$ to $\Sigma 0$ thus computed is then used to determine whether it is possible to make a reliable data decision from the raw data for the ith bar.

These decisions as to the ith bar of the bar code are made as follows as further shown in FIG. 3. If the ratio R is greater than $(1+\alpha)$, then it is determined that a reliable decision can be made, and that the decision is that the ith bar is a wide (or "1") bar. On the other hand, if the ratio R is less than $(1-\beta)$, then it is determined that a reliable decision is possible and that the ith bar of the bar code is a narrow (or "0") bar. On the other hand, if the ratio R is equal to or greater than $(1-\beta)$ but equal to or less than $(1+\alpha)$, then it is determined that no reliable data decision is possible for the ith bar. In effect, it is then determined that the label reader 100 cannot provide a reliable bar code output data reading for the particular label just read. In such event the label reader 100 will provide a local unreliable data indication, to alert a manual operator that a particular label cannot be reliably read, and accordingly, must be read into the computer (not shown) by some other means.

It is of course to be noted that the parameter $\alpha$ is to be selected such that $\alpha > 0$, and the parameter $\beta$ is to be selected such that $0 < \beta < 1$. It is further to be seen that when relatively large values are selected for the parameters $\alpha$ and $\beta$, the confidence then associated with the reliability of the output data from the label reader 100 will be very high. This is the case, because when such relatively large values are selected, it will be more difficult than otherwise for the ratio R to satisfy the criteria for a reliable data decision, unless, the raw data, is, in fact, highly reliable. Similarly, should relatively low values be selected for the parameters $\alpha$ and $\beta$, the frequency of occurrence of decisions that the data is unreliable will be lessened, but at the same time, not as much confidence can be associated with the reliability of the output data. Therefore, in practical use, it is necessary to appropriately select the values of the parameters $\alpha$ and $\beta$ in accordance with the conditions and the environment of use of the particular label reader 100, giving consideration to the penalties associated with providing erroneous information to the computer.

It will, of course, be recognized by those skilled in the art, that the processing means 105, and the method of the present invention may be implemented by digital logic hardware means or partially by such hardware means and partially by software means such as in a microprocessor based system. Indeed, it will be recognized, that most of the functions of the label reader 100 as described herein can be implemented in a microprocessor based system, thereby achieving considerable economies in the use of hardware elements. Nevertheless, it is also clear that the method of the present invention may be readily implemented with hardware logic.

It is of course also to be noted that the method of the present invention avoids certain difficulties experienced with coincidence detection type lable readers. In such coincidence type devices, the label reader seeks to determine whether successive coincidences of scanning readings exist along a given bar. In cases in which the quality of the bar code being read, for example, is uniformly poor, such coincidence test may not be satisfied whereas, with the method of the present invention, no difficulties would be encountered and a reliable decision could be made.

It will be understood that various changes in the the details and the steps of the present invention as herein described and illustrated may be made by those skilled in the art without departing from the scope and principle of the invention as expressed in the appended claims.

What is claimed is:

1. A method for enhancing the reliability of the output data from a label reader having a scanner and adapted to read a bar code consisting of a plurality of bars comprising the steps of:

obtaining a set of binary signals, each signal in said set being representative of a particular different point along a particular bar as scanned by the scanner;

forming a first sum equal to the number of binary "1" signals in said set;

forming a second sum equal to the number of binary "0" signals in said set;

computing the ratio (R) of said first sum to said second sum;

providing a binary "1" output decision for the particular bar if $R>(1+\alpha)$ where $\alpha>0$;

providing a binary "0" output decision for the particular bar if $R>(1-\beta)$ where $0<\beta<1$; and determining that a reliable output decision cannot be made for the particular bar if $(1-\beta)\leq R\leq(1+\alpha)$.

2. The method according to claim 1 wherein the bars comprising said bar code comprise a mix of wide bars and narrow bars.

3. The method according to claim 2 wherein a plurality of binary "1" signals are obtained for said set if the particular bar is a wide bar; and wherein a plurality of binary "0" signals are obtained for said set if the particular bar is a narrow bar.

4. The method according to claim 2 wherein a plurality of binary "1" signals are obtained for said set if the particular bar is a narrow bar, and wherein a plurality of binary "0" signals are obtained for said set if the particular bar is a wide bar.

* * * * *